Patented Nov. 2, 1937

2,098,200

UNITED STATES PATENT OFFICE 2,098,200

BUTYL-ACETONIC FERMENTATION PROCESS

Hugh R. Stiles, Terre Haute, Ind., assignor to Commercial Solvents Corporation, Terre Haute, Ind., a corporation of Maryland No Drawing. Application July 12, 1934, Serial No. 734,801

14 Claims. (Cl. 195—44)

The present invention relates to the utilization of waste carbohydrate materials, such as those obtained in the acid hydrolysis of grain or starch. More particularly, the present invention relates to the utilization of hydrol, the waste residual material from the corn-sugar industry, as a source of carbohydrate for the butyl-acetonic fermentation.

Hydrol comprises the molasses obtained as the residual mother liquor from which corn sugar is crystallized. This material contains about 75% solids, the major portion of which comprises glucose. Various attempts have been made to utilize this material as a source of carbohydrate for fermentation processes, especially for the butyl-acetonic fermentation, but up to the present time no successful method has been found for fermenting mashes containing desirably large amounts of this material. It has been found that amounts up to 15%, and in some cases as high as 25%, of hydrol could be substituted for maize in the butyl-acetonic fermentation of maize mashes. However, at higher concentrations the yields were found to drop off markedly. The reasons for the unsatisfactory results at the higher concentrations have not been definitely settled up to the present time, but the previously accepted explanation was that the hydrol contained toxic materials which inhibited the fermentation when present in sufficient quantity. There was no suggestion of nitrogenous deficiency in the mash since the residual liquors from the fermentation were known to contain valuable proteinaceous material for the preparation of feeds, and the nitrogenous content of the distillation slops presented a serious problem from the standpoint of sewage disposal.

However, I have now discovered that mashes containing high proportions of hydrol can be successfully fermented if there is added to the mash supplementary nitrogenous nutrients in the form of proteinaceous material from grain alcohol distillery slop. This particular type of nitrogenous material is especially suited for satisfying the deficiency of nitrogen in mashes of this type, being superior to other proteinaceous materials or even other distillery slops such as those from molasses-alcohol distilleries. When employing this type of nitrogenous material according to the process outlined herein, I have been able to secure practically theoretical yields of solvents from mashes containing high proportions of hydrol and even in mashes in which hydrol comprises substantially all of the fermentable carbohydrate. The nitrogen may be supplied by the proteinaceous material of the grain alcohol distillery slop, either in the form of the whole slop or in the form of concentrated slop, evaporated feed, screened feed, or "distiller's grains". The term "proteinaceous material" in this connection is thus seen to include both the soluble and insoluble forms of nitrogen in the slop. In general, I prefer to utilize both these forms of nitrogen by employing whole slop as the supplementary nutrient. This procedure is advantageous from an economical standpoint, and the slop may readily be incorporated into the mash by substituting it for a portion of the water.

The grain alcohol distillery slops suitable for my process may be any of the usual types, such as those from the malt process or the amylo process. The former process is exemplified by the common procedure of saccharifying a cereal mash by means of barley malt and the latter by saccharifying by means of Amyloces Rouxii, Mucor or Rhizopus Delemar as described in the article on this process in Industrial and Engineering Chemistry, 25, 87–89, (1933). In general, I prefer to utilize the slop from the malt process since the proportion of unchanged grain proteins tends to be somewhat higher in this case. The optimum amount of distillery slop to be added in any fermentation will, of course, depend upon the amount of other nitrogenous material present in the mash. For example, a mash containing substantial amounts of maize or other grain will require less additional nitrogenous material than one in which hydrol comprises substantially all of the fermentable carbohydrate. However, in general it may be said that from 10% to 50% by volume of whole slop, or its equivalent of other forms of proteinaceous material derived from the whole slop, will be found to be satisfactory. From 30% to 40% by volume will usually be found to be preferable and may advantageously be employed in any mash containing hydrol as a major source of carbohydrate. Smaller amounts may, of course, be sufficient in many cases, and the lower economical limit may easily be determined by preliminary fermentations.

The proteinaceous material from grain alcohol distillery slop, especially if whole slop or concentrated slops are employed, will usually be found to contain considerable amounts of organic acids. For example, the whole slop will usually be found to have a pH of 3.5 to 4.0. This presents a further problem in the utilization of such materials in the butyl-acetonic fermentation, and an important aspect of my invention comprises the control of the hydrogen ion concentration when such materials are employed. I have found that if acid slops are utilized without neutralization, the butyl-acetonic fermentation will not pass its normal acidity peak but will continue to form acids rather than solvents. On the other hand, if a mash containing large amounts of distillery slop is neutralized to a pH corresponding to the initial pH of a grain mash, the yield of solvents will be markedly reduced. I have discovered that in order to obtain optimum yields of solvents the mash should be only partially neutralized so that the final hydrogen ion concentration in the fermented mash falls within the range 4.2 to 5.0. In general, I prefer to adjust the initial acidity so that the final hydrogen ion concentration is approximately 4.6, i. e. 4.5 to 4.7. When the usual amounts of distillery slops are employed, as outlined above, this may be accomplished by adjusting the initial acidity of the mash to a pH of 4.4 to 4.6. The exact value, of course, will depend upon the amount of slop employed and upon the absolute acidity of the slop. In any case the optimum value for a given mash may easily be determined by a preliminary series of fermentations. The neutralization may be effected in any known manner such as by the use of ammonia or alkaline compounds of alkali metals or alkaline earth metals. I prefer, however, to use alkali compounds such as soda ash.

The following examples will perhaps best illustrate the process of the present invention.

Example I

The fermentation vessel was filled to one-fourth its capacity with sterile 6.5% maize mash, inoculated with 6% by volume of an actively fermenting culture of *Clostridium acetobutylicum* (Weizmann) and allowed to ferment 16 hours at 37° C. At this point the vessel was filled to fermenting capacity with a sterile hydrol-slop mash of approximately equivalent carbohydrate concentration neutralized to a pH of 4.6. The fermentation was then allow to proceed to completion and the products were determined at the end of 67 hours. The results are shown in Table I below.

Table I

| Grain-alc. slop: percent by volume | Percent of total carbohydrate as sugar | | Concentration of carbohydrate as grams sugar per 100 cc. | Final pH | Solvent yield percent on sugar | Solvent ratio | | |
|---|---|---|---|---|---|---|---|---|
| | Hydrol | Maize | | | | Butyl alc. percent | Acetone percent | Ethyl alc. percent |
| 10 | 74.2 | 25.8 | 5.18 | 4.33 | 33.3 | 60.0 | 27.2 | 12.8 |
| 20 | 74.2 | 25.8 | 5.26 | 4.61 | 33.0 | 60.9 | 28.0 | 11.1 |
| 25 | 74.2 | 25.8 | 5.23 | 4.66 | 33.4 | 60.8 | 28.2 | 11.0 |
| 30 | 74.2 | 25.8 | 5.24 | 4.86 | 33.6 | 59.8 | 29.2 | 11.0 |
| 35 | 74.2 | 25.8 | 5.24 | 4.90 | 33.9 | 58.3 | 28.8 | 12.9 |

It may be seen from the above table that the yields secured in this series of fermentations ranged between 33.0 and 33.9% on the total sugar. This represents a substantially complete theoretical yield and is far in excess of any yields previously obtained in fermentations containing large amounts of hydrol.

Example II

A series of fermentations were carried out according to Example I, above, with the exception that the total carbohydrate of the mash was increased to approximately 7% maize equivalent. The results of these fermentations are shown in Table II below.

Table II

| Grain-alc. slop: percent by volume | Percent of total carbohydrate as sugar | | Concentration of carbohydrate as grams sugar per 100 cc. | Final pH | Solvent yield percent on sugar | Solvent ratio | | |
|---|---|---|---|---|---|---|---|---|
| | Hydrol | Maize | | | | Butyl alc. percent | Acetone percent | Ethyl alc. percent |
| 25 | 75.0 | 25.0 | 5.78 | 4.80 | 30.8 | 58.7 | 31.4 | 9.9 |
| 35 | 75.0 | 25.0 | 5.79 | 4.97 | 32.8 | 61.5 | 29.7 | 8.8 |
| 45 | 75.0 | 25.0 | 5.76 | 4.89 | 32.8 | 61.3 | 30.7 | 9.0 |
| 0 | 0 | 100.0 | 5.87 | ------ | 31.8 | 61.5 | 29.8 | 8.7 |

The results in the above table indicate that at higher total carbohydrate concentrations a somewhat higher proportion of slop is required for optimum results than in the preceding example. However, it may be seen that 35% of slop gives a very satisfactory yield—in fact, greater than that secured in the whole maize control fermentation.

Example III

A mash was prepared solely from hydrol and slop, neutralized to a pH of 4.8, and sterilized for 30 minutes at 110° C. The sterile slop was inoculated with an actively fermenting maize mash culture of *Clostridium acetobutylicum* (Weizmann) and the fermentation products were determined after 67 hours. The results are shown in Table III below.

Table III

| Grain-alc. slop: percent by volume | Percent of total carbohydrate as sugar | | Concentration of carbohydrate as grams sugar per 100 cc. | Final pH | Solvent yield percent on sugar | Solvent ratio | | |
|---|---|---|---|---|---|---|---|---|
| | Hydrol | Maize | | | | Butyl alc. percent | Acetone percent | Ethyl alc. percent |
| 30 | 97.7 | 2.3 | 5.23 | 4.79 | 33.0 | 62.5 | 27.6 | 9.9 |
| 40 | 97.7 | 2.3 | 5.08 | 4.82 | 33.8 | 62.2 | 27.8 | 10.0 |
| 50 | 97.7 | 2.3 | 5.10 | 4.87 | 33.7 | 62.5 | 28.1 | 8.4 |

It may be seen that very satisfactory yields were obtained in all of the above fermentations even though hydrol constituted practically the entire source of carbohydrate in the mash. The 2.3% carbohydrate represented as maize in the above table constituted the carbohydrate added in the inoculant. It will be recognized, of course, that a hydrol inoculant could have been employed in place of a maize mash inoculant.

Although my invention has been illustrated by the above specific examples, it is to be distinctly understood that it is not to be limited to the particular materials or procedures described therein. For example, although my invention is particularly adapted to the fermentation of hydrol, it will be evident to those skilled in the art that this process may advantageously be applied to other carbohydrate materials which are deficient in suitable nitrogenous nutrients for the butyl-acetonic fermentation. Various equivalent materials readily suggest themselves, as for example glucose, lactose, sucrose or other relatively pure sugar solutions, wood sugar, pentose solutions such as the xylose solution obtained by the hydrolysis of corncobs, etc. Certain samples of molasses may likewise be benefited by the application of my process.

Although the fermentations of the examples were all carried out by means of *Clostridium acetobutylicum* (Weizmann), my process is applicable, generally, to the butyl-acetonic fermentation. Any of the known types of bacteria which produce butyl alcohol, acetone, and ethyl alcohol, and which are primarily starch-fermenting organisms may be utilized in my process. I prefer to utilize *Clostridium acetobutylicum* (Weizmann) which is the organism described in U. S. P. 1,315,585, but I may suitably employ any of the cultures designated in the literature as *Bacillus granulobacter pectinovorum*, *Bacillus amylobacter*, *Bacillus butylaceticum*, *Bacillus acetobutylicum*, etc., which are closely related to, or in some cases identical with, this organism.

Likewise, it will be apparent to those skilled in the art that various modifications of procedure may be employed without departing from the scope of my invention. For example, if a mixed mash, such as the maize-hydrol mashes of Examples I and II, is to be utilized, this mash may be prepared in the mixed form rather than in two separate mashes as in the examples. If mixed mashes are to be employed, it may be found to be advantageous to sterilize the two types of carbohydrate separately, even if the mash is to be directly fermented in the mixed state. The neutralization of the distillery slop may be effected separately or after admixture with the hydrol or other carbohydrate solution. Likewise, instead of relying solely upon the initial neutralization, the acidity of the fermenting mash may be controlled continuously or intermittently according to known procedures so that the final hydrogen ion concentration will fall within the desired limits. Numerous other variations in procedure will be apparent to those skilled in the art. In general, it may be said that such modifications or the use of any equivalents which would naturally occur to one skilled in the art may be employed without departing from the scope of my invention.

Having now described my invention, what I claim is:

1. In the butyl-acetonic fermentation by means of *Clostridium acetobutylicum* (Weizmann) of mashes including as a major constituent a carbohydrate-containing material which is deficient in nitrogenous nutrients for said bacteria, the step which comprises effecting the fermentation in a mash containing proteinaceous material from grain alcohol distillery slop, the said proteinaceous material including the insoluble portion of said slop.

2. In the butyl-acetonic fermentation by means of *Clostridium acetobutylicum* (Weizmann) of mashes including as a major constituent a carbohydrate-containing material which is deficient in nitrogenous nutrients for said bacteria, the step which comprises effecting the fermentation in a mash containing proteinaceous material from grain alcohol distillery slop equivalent to from 10–50% by volume of whole slop, the said proteinaceous material including the insoluble portion of said slop.

3. In the butyl-acetonic fermentation by means of *Clostridium acetobutylicum* (Weizmann) of mashes containing hydrol as a major constituent, the step which comprises effecting the fermentation in a mash containing proteinaceous material from grain alcohol distillery slop equivalent to from 10–50% by volume of whole slop, the said proteinaceous material including the insoluble portion of said slop.

4. In the butyl-acetonic fermentation by means of *Clostridium acetobutylicum* (Weizmann) of mashes including as a major constituent a carbohydrate-containing material which is deficient in nitrogenous nutrients for said bacteria, the steps which comprise effecting the fermentation in a mash containing whole grain alcohol distillery slop, and controlling the acidity of the fermenting mash whereby the final hydrogen ion concentration falls within the range pH 4.2 to 5.0.

5. In the butyl-acetonic fermentation by means of *Clostridium acetobutylicum* (Weizmann) of mashes including as a major constituent a carbohydrate-containing material which is deficient in nitrogenous nutrients for said bacteria, the steps which comprise effecting the fermentation in a mash containing from 10–50% by volume of whole grain alcohol distillery slop, and controlling the acidity of the fermenting mash whereby the final hydrogen ion concentration falls within the range pH 4.2 to 5.0.

6. In the butyl-acetonic fermentation by means of *Clostridium acetobutylicum* (Weizmann) of mashes containing hydrol as a major constituent, the steps which comprise effecting the fermentation in a mash containing from 10–50% by volume of whole grain alcohol distillery slop, and controlling the acidity of the fermenting mash whereby the final hydrogen ion concentration falls within the range pH 4.2 to 5.0.

7. In the butyl-acetonic fermentation by means of *Clostridium acetobutylicum* (Weizmann) of mashes including as a major constituent a carbohydrate-containing material which is deficient in nitrogenous nutrients for said bacteria, the step which comprises satisfying the deficiency in nitrogenous nutrients in said mash by supplying nitrogen in the form of proteinaceous material from grain alcohol distillery slop, said proteinaceous material including the insoluble portion of said slop.

8. In the butyl-acetonic fermentation by means of *Clostridium acetobutylicum* (Weizmann) of mashes containing hydrol as a major constituent, the step which comprises satisfying the deficiency in nitrogenous nutrients in said mash by supplying nitrogen in the form of proteinaceous material from grain alcohol distillery slop, the said proteinaceous material including the insoluble portion of said slop.

9. In the butyl-acetonic fermentation by means of *Clostridium acetobutylicum* (Weizmann) of mashes including as a major constituent a carbohydrate-containing material which is deficient in nitrogenous nutrients for said bacteria, the steps which comprise satisfying the deficiency in nitrogenous nutrients in said mash by supplying nitrogen in the form of whole grain alcohol distillery slop, and controlling the acidity of the fermenting mash whereby the final hydrogen ion concentration falls within the range 4.2 to 5.0.

10. In the butyl-acetonic fermentation by means of *Clostridium acetobutylicum* (Weizmann) of mashes containing hydrol as a major constituent, the steps which comprise satisfying the deficiency in nitrogenous nutrients in said mash by supplying nitrogen in the form of whole grain alcohol distillery slop, and controlling the acidity of the fermenting mash whereby the final hydrogen ion concentration falls within the range 4.2 to 5.0.

11. A process for the production of butyl alcohol, acetone, and ethyl alcohol which comprises subjecting to the action of bacteria of the type *Clostridium acetobutylicum* (Weizmann) a mash containing hydrol as a major constituent and containing proteinaceous material from grain alcohol distillery slop equivalent to from 30-40% by volume of whole slop, the said proteinaceous material including the insoluble portion of said slop.

12. A process for the production of butyl alcohol, acetone, and ethyl alcohol which comprises subjecting to the action of bacteria of the type *Clostridium acetobutylicum* (Weizmann) a mash containing hydrol as a major constituent and containing from 30-40% by volume of whole grain alcohol distillery slop, while controlling the acidity of the fermenting mash whereby the final hydrogen ion concentration falls within the range pH 4.2 to 5.0.

13. A process for the production of butyl alcohol, acetone, and ethyl alcohol which comprises subjecting to the action of bacteria of the type *Clostridium acetobutylicum* (Weizmann) a mash comprising, essentially, hydrol and proteinaceous material from grain alcohol distillery slop equivalent to from 30-40% by volume of whole slop, the said proteinaceous material including the insoluble portion of said slop.

14. A process for the production of butyl alcohol, acetone, and ethyl alcohol which comprises subjecting to the action of bacteria of the type *Clostridium acetobutylicum* (Weizmann) a mash comprising, essentially, hydrol and from 30-40% by volume of whole grain alcohol distillery slop, while controlling the acidity of the fermenting mash whereby the final hydrogen ion concentration falls within the range pH 4.2 to 5.0.

HUGH R. STILES.